3,441,650
THERAPY OF AMMONIACAL INTOXICATIONS BY DI-L-ORNITHINE α-KETOGLUTARATE

Jacques Georges Albert Eugene Maillard, Paris, and Michel Marius Jean Vincent, Bagneux, France, assignors to Laboratoires Jacques Logeais, Societe Anonyme, Issy-les-Moulineaux, Hauts-de-Seine, France, a French body corporate
No Drawing. Filed July 23, 1965, Ser. No. 474,502
Int. Cl. A61k 27/00, 9/00; C07c 101/24
U.S. Cl. 424—316                5 Claims

ABSTRACT OF THE DISCLOSURE

Di-L-ornithine α-ketoglutarate is useful for the treatment of ammoniacal intoxications. To this effect, it is administered to patients suffering from these intoxications at a daily dose of 0.50–20 g. either orally or by venous perfusion.

---

The object of the present invention is to provide as a new industrial product, the di-L-ornithine α-ketoglutarate.

This new salt of ornithine satisfies the following structural formula:

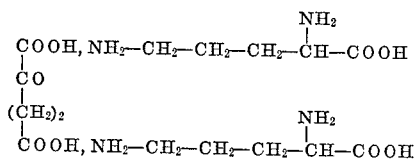

and the empirical formula $C_{15}H_{30}N_4O_9$ (M.W.=410.4).

It is obtained in fact in the dihydrate form containing 8.07% of water which can be dehydrated by drying under a vacuum. It melts at 128–130° C. (capillary tube).

Di-L-ornithine α-ketoglutarate in the dihydrate form is in the form of a microcrystalline powder which is white or slightly yellow, but little hygroscopic. It is decomposed by heat as soon as 120° C. is reached. It easily dissolves in water. The pH of the solution obtained is in the neighbourhood of neutrality. Its rotary power $[\alpha]_D 24$ is $+7°$ (C=2% in water at pH 7.3).

Di-L-ornithine α-ketoglutarate can be employed as an adjuvant in the feeding of animals. It has moreover therapeutic properties in the treatment of ammoniacal intoxications as will be shown hereinafter.

Another object of the invention is to provide a process of preparing di-L-ornithine α-ketoglutarate.

This process comprises reacting α-ketoglutaric acid, or one of the salts thereof, with L-ornithine or one of the salts thereof. This reaction is carried out in an aqueous medium by employing advantageously substantially stoichiometric amounts of the reagents. By way of salts which can be used in this reaction there may be mentioned the barium α-ketoglutarate and the L-ornithine sulfate which can react on each other with a double decomposition.

According to a preferred manner of carrying out the process, the reaction is effected by means of an ion exchanger. For this purpose, the α-ketoglutaric anion can be bound on an anion exchanger and then eluted with L-ornithine, the eluate obtained thus comprising di-L-ornithine α-ketoglutarate.

In order to bind the α-ketoglutaric anion, an aqueous solution of α-ketoglutaric acid, or a salt thereof and in particular a metal salt thereof is percolated through an anion exchanger column. For the elution there is percolated on this column an aqueous solution of ornithine, or of a salt thereof and in particular an acid mineral salt thereof.

This manner of carrying out the process has great advantages over the direct reaction of α-ketoglutaric acid with the L-ornithine and the double decomposition between the two salts of these compounds.

The L-ornithine base necessary when employing the direct reaction has the drawback of being very difficult to obtain in the pure state owing to its instability. Its use therefore requires the purification of the resulting di-L-ornithine α-ketoglutarate and this purification is in itself difficult and results in considerable losses.

Obtaining di-L-ornithine α-ketoglutarate by a double decomposition has the drawback of regularly resulting in products which are more or less soiled by mineral impurities the elimination of which is also difficult and results in considerable losses.

On the other hand, the suitable starting materials for carrying out the process by means of ion exchangers are, on the one hand, α-ketoglutarate of calcium which can be easily obtained at a satisfactory degree of purity owing to its properties of solubility, or α-ketoglutaric acid itself and, on the other hand, the hydrochloride of L-ornithine which can also be obtained at a satisfactory degree of purity. However, it must be understood that these starting materials are not intended to limit the scope of the invention; it is possible to employ the other salts formed from α-ketoglutaric acid and ornithine respectively with other ordinary cations or anions.

Thus, in the examples hereinafter illustrating this manner of carrying out the process the resins employed are not intended to limit the scope of the invention, the result obtained being reproducible with other ion exchangers.

The following examples illustrate the invention:

EXAMPLE 1

15.3 g. (0.116 mole) of L-ornithine base dissolved in 55 ml. of water are added, while stirring and cooling, to a solution of 8.47 g. (0.058 mole) of α-ketoglutaric acid in 50 ml. of water. The solution of the two components is concentrated to dryness and the crystalline residue obtained is, after crushing and washing with anhydrous ethanol, continuously extracted with ether in a Soxhlet apparatus, then dried under low pressure. The yield is quantitative (23.77 g.).

EXAMPLE 2

A solution of 2.3 g. (0.010 mole) of L-ornithine sulfate in 100 ml. of water is added to a stirred suspension of 2.81 g. (0.010 mole) of barium α-ketoglutarate in 100 ml. of water. After filtration of the barium sulfate formed and concentration to dryness of the filtrate, the crystalline residue is treated as before with ethanol and anhydrous ether. The yield is quantitative (4.1 g.).

EXAMPLE 3

There is passed through a column containing 100 ml. of a highly basic anion exchanger resin—for example a resin derived from polystyrene and having quaternary ammonium groups—a solution of hydrochloric acid which transforms the resin into a hydrochloric resin. The amount of chlorine ions bound corresponds to 1/10 of one equivalent of ClH. The column is washed with distilled water until absence of chloride in the eluate.

A 1% aqueous solution of calcium α-ketoglutarate is passed through the column thus prepared. By means of a first ionic exchange the exchanger is saturated with α-ketoglutaric ion while it liberates the chlorine ions which is manifested by the presence of calcium chloride in the eluate. The column is washed with distilled water so as to eliminate all the calcium chloride and the possible excess of calcium α-ketoglutarate. By means of a regular examination of the eluate it is possible to avoid that this excess of reagent be excessive, but the eluates containing an excess of calcium α-ketoglutarate are collected since they are of use in a subsequent manufacture.

There is passed through the column thus obtained now constituted of the exchanger in the α-ketoglutaric resin form, a solution containing 17 g. of ornithine monohydrochloride, namely $\frac{1}{10}$ of gram-molecule. After the passage of this solution the column is washed with distilled water. The eluate is frequently checked and the elution is stopped as soon as traces of chlorides appear. In the fraction devoid of chloride thus separated, the analysis indicates that there is 12.95 g. of ornithine and 7.7 g. of α-ketoglutaric acid (theoretical: 13.20 and 7.30, respectively).

To obtain crystallized di-L-ornithine α-ketoglutarate the separated eluate is slightly concentrated, and alcohol is added until a persistent cloudiness is observed (about 75 ml. of alcohol for 50 ml. of concentrated eluate is necessary). After cooling in the neighbourhood of 0° C. for 12 hours, a crystalline mass is formed which is easily isolated by filtration. These crystals are drained, washed with 70% alcohol then 90% alcohol and finally well drained. Finally they are dried for about 15 minutes at 100° C. under a vacuum. In this way a white finely crystallized product is obtained whose melting point is 128–130° C. (capillary tube). After concentration of the mother waters at low temperature, a second fraction of di-L-ornithine α-ketoglutarate which is also colourless, is obtained. In all, between 20 and 21 g. of ornithine α-ketoglutarate (dihydrate) are obtained, which corresponds to a yield of 95% relative to the amount of ornithine hydrochloride employed.

EXAMPLE 4

Ammonia is passed through a column containing 150 ml. of a slightly basic anion exchanger resin—for example a resin derived from polystyrene and having aliphatic aminated groups—then a washing with water is effected so as to eliminate excess of ammonia. Passed through the column thus prepared are 400 ml. of a 1.2 N α-ketoglutaric acid solution and then distilled water until definite absence of ketoglutarate in the eluate. According to the results of the tests 28.5 g. of α-ketoglutaric acid are thus bound.

By means of a second column constituted by a highly basic anion exchanger resin—for example a resin derived from polystyrene and having quaternary ammonium groups—and through which there is passed a solution of ornithine hydrochloride until the appearance of traces of chlorides in the eluate, a solution of ornithine was obtained, which is titrated.

Passed through a slightly basic exchanger column, which is in the form of a ketoglutaric resin after the treatment described hereinbefore, is a volume of a solution of ornithine containing 54 g. of this aminated acid, for example 260 ml. of a solution containing 10.8 g. of ornithine base in 100 ml. of solution, by fractions of 50 ml., followed by washings with water. The pH of the eluate is checked, this pH rising rapidly to the neighbourhood of neutrality. At the end of the elution the pH becomes alkaline and the solution becomes coloured. This fraction is collected separately and is of use in a subsequent manufacture. The united colourless fractions (300 ml.) are substantially neutral and titrations indicate that they contain 63 g. of di-L-ornithine α-ketoglutarate, that is their concentration is in the neighbourhood of 21%. The salt is precipitated by the addition of three volumes of alcohol; after 2 hours at 0° C. di-L-ornithine α-ketoglutarate is separated in the form of a thick syrup, the crystallization is initiated and the crystallization is allowed to finish while stirring at 0° C. The yield of the first fraction thus obtained (MP. 128° C.) is about 70% of the theoretical yield relative to the ornithine employed.

As mentioned hereinbefore, it has been discovered according to the invention that di-L-ornithine α-ketoglutarate has great therapeutic interest in the treatment of ammoniacal intoxications namely of hyperammoniemia due mostly to a hepatic insufficiency manifested by the disturbance of the detoxication of ammonia in the liver. It is known that these intoxications in the most serious cases can lead to an often fatal hepatic coma.

The action of di-L-ornithine α-ketoglutarate is manifested by the exaltation of the ureogenesis, the supply of ammonia-binding substrates (the L-ornithine being the substrate capable of the highest binding of ammonia per molecule) and a specific energetic addition.

Although α-ketoglutaric acid (in the form of a salt and in particular calcium) on one hand, and L-ornithine (in the hydrochloride form) on the other, have already been proposed or employed separately in therapeutics in the treatment of hyperammoniemia, di-L-ornithine α-ketoglutarate has a marked superiority over each of the compounds entering into its constitution.

Thus, α-ketoglutaric acid contained in di-L-ornithine α-ketoglutarate is in the organism capable of binding one molecule of $NH_3$ in turning itself into glutamic acid. It thus contributes to the ammoniacal detoxication insured by L-ornithine.

The endothermic reactions of the ureogenesis are energetically coupled with the tricarboxylic cycle of Krebs whose α-ketoglutaric acid constitutes an essential link.

Di-L-ornithine α-ketoglutarate has a more powerful action than the sum of the actions of the two compounds entering into its constitution. There is thus a synergetic action between the constituents chemically combined in the form of a single compound, as confirmed by the pharmacological tests mentioned hereinafter.

Finally the solutions of di-L-ornithine α-ketoglutarate have a pH in the close vicinity of 7 which constitutes, as concerns therapeutic injections, an important advantage over ornithine hydrochloride solutions whose pH is 3.5–4.

The pharmacological tests were carried out in the following manner:

The protection against acute intoxication with ammonium chloride afforded by the various salts of L-ornithine is ascertained. There are employed doses of L-ornithine in the proportion of 1 gram-molecule of L-ornithine for 2 gram-molecules of ammonia, this proportion being in effect that revealed in the biosynthesis of urea.

The procedure employed is the following:

The L-ornithine salts employed in these tests were administered 30 minutes before the ammonium chloride by the intraperitoneal route to Swiss mice weighing 20–25 g. (batches of 20 animals).

The mortality percentage was noted hourly. It reached its final value two hours after the injection of $ClNH_4$.

The $LD_{50}$ were calculated by the probit method starting with doses of $ClNH_4$ (and consequently of ornithine) in a geometric progression.

The results obtained were the following:

The $LD_{50}$ of $ClNH_4$ by the intraperitoneal route is 550 mg./kg.

After treatment with the L-ornithine salts there is observed a decrease in the toxicity consecutive to the injection of $ClNH_4$ which is manifested by an increase in the $LD_{50}$ of the $ClNH_4$.

The results are shown in the following table:

|  | $LD_{50}$ (mg./kg.) | Percentage of increase in the $LD_{50}$ |
|---|---|---|
| $ClNH_4$ | 550 | |
| $ClNH_4$ + L-ornithine hydrochloride | 840 | +53 |
| $ClNH_4$ + L-ornithine α-ketoglutarate | 1,010 | +84 |

It was also observed that:

(1) Sodium α-ketoglutarate at corresponding doses does not modify the toxicity of $ClNH_4$.

(2) L-ornithine citrate has an activity identical to that of the hydrochloride.

These results show the high efficacity of di-L-ornithine α-ketoglutarate in the treatment of ammoniacal intoxications. They also show the potentialization of the detoxifying action of L-ornithine when this base is salified with α-ketoglutaric acid. Indeed, the increase in the $LD_{50}$ of $ClNH_4$ in the presence of detoxifying agents changes from 53% to 84% when di-L-ornithine α-ketoglutarate is substituted for L-ornithine hydrochloride whereas α-ketoglutaric acid is itself without action on this $LD_{50}$.

Bearing in mind the foregoing the indications of di-L-ornithine α-ketoglutarate are ammoniacal intoxications and states of hyperammoniemia. In these indications di-L-ornithine α-ketoglutarate can be employed, in the form of, among others:

Freeze-dried powder in sterile bottles (1 or 2 g. per bottle) to be dissolved in sodium chloride or glucose-containing serum for venous perfusion.

Ampoules of injectable 1–10% solution.

Drinkable ampoules containing 0.10 g.–0.50 g. of salt.

Tablets containing 0.10 g.–0.50 g. of salt with the usual excipients.

The usual daily doses rang from about 0.50 to about 6 g.

In certain cases they can be as much as 20 g. per day.

By way of an additional illustration of the efficacity of di-L-ornithine α-ketoglutarate, the results obtained clinically in five cases of hepatic coma will be mentioned, the patients being in a relative state of hyperammoniemia, as shown by the following figures:

|  | Mg./l |
|---|---|
| Case 1 (ascitic cirrhosis) | 1.20 |
| Case 2 (ascitic cirrhosis) | 0.96 |
| Case 3 (ascitic cirrhosis) | 1.40 |
| Case 4 (anascitic cirrhosis) | 1.00 |
| Case 5 (precirrhosis) | 1.75 |

These five patients (four men and one woman), whose ages ranged between 44 and 56 years, had at varying degrees most of the usual clinical symptoms of acute hepatic neurotoxicosis: cephalea followed in two cases (cases 4 and 5) by a state of confusion with opposition accompanied by contractures, or (cases 1, 2 and 3) by anguish then torpidity with obnubilation, ample and irregular trembling named flapping tremors and even by a pseudo-meningitis syndrome (case 2).

In two cases (cases 1 and 3) the neurotoxic state was set off by a digestive hemorrhage of average importance. In case 5 an acute intestinal infection episode seemed to be the origin of the accidents, whereas the other two patients seemed to be themselves responsible for the appearance of their accidents by pronounced errors in their diet.

None of them had undergone a portacavel shunt surgical intervention.

The therapeutic treatment administered was the following:

A. Particular treatments (a) Patients 1 and 3 received a rectoclysis containing 10% glycerin for evacuation of blood extravasated in the intestine.

(b) Patient 5 received two tablets of neomycin four times daily for three consecutive days.

None of the five patients received cortisone derivatives, glutamic acid, arginine, or perfusion of fresh blood.

B. Common general treatment

In addition to di-L-ornithine α-ketoglutarate, the five patients received a standard treatment with vitamins $B_1$, $B_2$, C and $K_1$ and injectable hepatic extracts.

C. Treatment with di-L-ornithine α-ketoglutarate

The product was in the form of bottles of sterile freeze-dried powder, containing 2 g. per bottle.

(1) As soon as ammoniemia was observed, the first contents of a bottle dissolved in 50 cc. of serum containing 50% glucose was administered rapidly by the intravenous route.

(2) The contents of the second bottle, dissolved in 200 cc.–500 cc. of serum containing 50% glucose (depending on the needs of the patient as concerns hydric supply) was then administered slowly by a venous perfusion (40 drops per minute).

The degree of ammoniemia ascertained a half hour after the end of the perfusion.

Owing to the gravity of their condition, patients 1, 3 and 5 also received five units of insulin which were injected in the tube for the perfusion of the solution a half hour after starting up the operation.

Apart from the usual clinical checking in such cases and the noting of the amount of ammoniemia before and after treatment, the alkaline reserve, the natremia, the kaliemia and the glycemia were measured each time.

The results were the following:

(a) Good results: patients 1, 2 and 5 all showed a very distinct return of consciousness as soon as the end of the perfusion was reached or within the hours following it, and this improvement was maintained and progressively reinforced in the following days.

A half hour after the end of the perfusion the amounts of ammoniemia found were respectively:

|  | Mg./l. |
|---|---|
| Case 1 | 0.70 |
| Case 2 | 0.63 |
| Case 5 | 0.92 |

(b) Fair results: patient 3 gradually came out of coma the next day, the ammoniemia changing from 1.40 mg./l. to 0.95 mg./l. after the end of the perfusion, and to 0.72 mg./l. 24 hours after.

Unfortunately, the clinical signs of neurotoxicosis reappeared 5 days after and the ammoniemia reached 1.20 mg./l.

The treatment was resumed but, despite the addition of 1 g. of delta cortisone daily, this time remained ineffective. Death occurred without a further phase of clinical or biological improvement.

(c) Negative result:

The treatment was without effect on patient 4 who died within three hours after the perfusion despite a small but noticeable reduction in the ammoniemia (0.88 mg./l. instead of 1 mg./l.).

To summarise, it should be noted that the hepatic coma remains despite progress in therapeutics, a grave complication of overall hepatic inadequacy.

Neurotoxicosis or exhaustion, which corresponds to a veritable death of the liver, is clearly beyond any remedy.

None of the five patients mentioned hereinbefore had reached this stage, but their state corresponded on the whole to a severe encephalopathy with a hyperammoniemia which can still be improved and cured in a limited number of cases.

Now, there were obtained three rapid disappearances of clinical signs with a noticeable drop in the ammoniemia and a temporary clinical and biological improvement (followed by fatal relapse) in four of the five patients treated for the first time with di-L-ornithine α-ketoglutarate.

As none of the usual therapeutic means employed in addition is sufficient to result in such effects and can explain such a high percentage of good results, it would seem that the latter are due to the action of the compound according to the invention.

Having now described our invention what we claim as new and desire to secure by Letters Patent is:

1. Therapeutic composition for the treatment of ammoniacal intoxications, in the form of a unit dose, said composition being in the form of tablets comprising 0.20–0.50 g. of di-L-ornithine α-ketoglutarate and a base for tablets.

2. Therapeutic composition for the treatment of ammoniacal intoxications, in the form of a unit dose, said composition being in the form of drinkable ampoules each containing 0.20–0.50 g. of di-L-ornithine α-ketoglutarate.

3. Therapeutic composition for the treatment of ammoniacal intoxications, in the form of a unit dose, said composition being in the form of injectable ampoules containing an injectable 1–10% solution of di-L-ornithine α-ketoglutarate.

4. Process for the treatment of ammoniacal intoxications consisting in administering to patients suffering from said intoxications from 0.50 g. to 20 g. per day of di-L-ornithine α-ketoglutarate.

5. Process as claimed in claim 4, wherein di-L-ornithine α-ketoglutarate is administered by venous perfusion in solution in a solvent selected from sodium chloride and glucose-containing serums.

References Cited
UNITED STATES PATENTS 3,020,201  2/1962  Osterberg _____ 167—55

OTHER REFERENCES

Greenstein, J. P., et al.: "Studies on the Metabolism of Amino Acids and Related Compounds in Vivo VII", Archives of Biochem. and Biophysics, 71, pp. 458–465 (1957).

ALBERT T. MEYERS, *Primary Examiner.*

DAREN M. STEPHENS, *Assistant Examiner.*

U.S. Cl. X.R.

99—2; 260—501; 424—361, 366